United States Patent [19]

Wilson et al.

[11] Patent Number: 4,855,396
[45] Date of Patent: Aug. 8, 1989

[54] POLYESTERS CONTAINING COVALENTLY BOUND QUATERNARY PHOSPHONIUM SALTS

[75] Inventors: John C. Wilson; Thomas A. Jadwin, both of Rochester, N.Y.

[73] Assignee: Eastman Kodak Company, Rochester, N.Y.

[21] Appl. No.: 229,044

[22] Filed: Aug. 5, 1988

[51] Int. Cl.$^4$ .............................................. C08G 63/20
[52] U.S. Cl. ................................. 528/272; 528/287; 528/295; 528/299; 528/308; 525/437; 430/106; 430/107; 430/110; 430/115
[58] Field of Search ............... 528/272, 287, 295, 299, 528/308; 525/437; 430/110, 106, 107, 115

[56] References Cited

U.S. PATENT DOCUMENTS

| | | | |
|---|---|---|---|
| 3,732,183 | 5/1973 | Popp et al. ........................... | 528/287 |
| 3,895,134 | 7/1975 | Kigane et al. ....................... | 427/246 |
| 4,005,057 | 1/1977 | Singh et al. ......................... | 524/131 |
| 4,006,123 | 2/1977 | Samuelson et al. ................. | 528/287 |
| 4,035,346 | 7/1977 | Samuelson et al. ................. | 528/337 |
| 4,038,258 | 7/1977 | Singh et al. ......................... | 525/437 |
| 4,145,473 | 3/1979 | Samuelson et al. ................. | 428/373 |
| 4,224,396 | 9/1980 | Pollet .................................. | 430/107 |
| 4,299,898 | 11/1981 | Williams et al. ..................... | 430/106 |
| 4,496,643 | 1/1985 | Wilson et al. ....................... | 430/110 |
| 4,506,070 | 3/1985 | Ben ...................................... | 528/287 |
| 4,525,446 | 6/1985 | Uytterhoeven et al. ............ | 430/117 |
| 4,537,848 | 7/1985 | Yourd et al. ........................ | 430/110 |
| 4,547,449 | 10/1985 | Alexandrovich et al. .......... | 430/115 |
| 4,606,989 | 8/1986 | Uytterhoeven et al. ............ | 430/106 |
| 4,639,403 | 1/1987 | Podszün et al. ..................... | 430/115 |
| 4,729,925 | 3/1988 | Chen et al. ......................... | 428/425.8 |

FOREIGN PATENT DOCUMENTS 7125627  7/1971  Japan.
4722334  6/1972  Japan.

*Primary Examiner*—John Kight
*Assistant Examiner*—S. A. Acquah
*Attorney, Agent, or Firm*—David F. Janci

[57] ABSTRACT

New polyesters are provided, having advantageous utility as dual function binder/charge agents in electrostatographic toner particles. The new polyesters contain a quaternary phosphonium salt comprising a cationic portion and an anionic portion, wherein the cationic portion comprises a phosphonium atom directly covalently bonded to at least one aryl moiety substituted with a group containing an ester linkage to the rest of the polyester, and wherein the anionic portion of the salt comprises an arylsulfonate moiety in which the aryl group is unsubstituted or is substituted with one or more alkyl, halide, or group having an ester linkage to the rest of the polyester.

9 Claims, No Drawings

POLYESTERS CONTAINING COVALENTLY BOUND QUATERNARY PHOSPHONIUM SALTS

FIELD OF THE INVENTION

This invention relates to polyesters containing certain quaternary phosphonium salts, wherein at least the cationic portions of the salts are covalently bonded to the polyesters through ester linkages. The polyesters can be prepared by melt-polycondensation techniques without thermal degradation of the phosphonium salts. The polyesters are especially useful as dual function binder/charge agents in electrostatographic toner particles.

BACKGROUND

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrostatographic developer. If desired, the latent image can be transferred to another surface before development.

One well-known type of electrostatographic developer comprises a dry mixture of toner particles and carrier particles. Developers of this type are commonly employed in well-known electrostatographic development processes such as cascade development and magnetic brush development. The particles in such developers are formulated such that the toner particles and carrier particles occupy different positions in the triboelectric continuum, so that when they contact each other during mixing to form the developer, they become triboelectrically charged, with the toner particles acquiring a charge of one polarity and the carrier particles acquiring a charge of the opposite polarity. These opposite charges attract each other such that the toner particles cling to the surfaces of the carrier particles. When the developer is brought into contact with the latent electrostatic image, the electrostatic forces of the latent image (sometimes in combination with an additional applied field) attract the toner particles, and the toner particles are pulled away from the carrier particles and become electrostatically attached imagewise to the latent image-bearing surface. The resultant toner image can then be fixed in place on the surface by application of heat or other known methods (depending upon the nature of the surface and of the toner image) or can be transferred to another surface, to which it then can be similarly fixed.

A number of requirements are implicit in such development schemes. Namely, the electrostatic attraction between the toner and carrier particles must be strong enough to keep the toner particles held to the surfaces of the carrier particles while the developer is being transported to and brought into contact with the latent image, but when that contact occurs, the electrostatic attraction between the toner particles and the latent image must be even stronger, so that the toner particles are thereby pulled away from the carrier particles and deposited on the latent image-bearing surface. In order to meet these requirements for proper development, the level of electrostatic charge on the toner particles should be maintained within an adequate range.

Many well-known types of toner particles useful in dry developers comprise polyester binder materials, chosen for their good combinations of advantageous properties, such as toughness, transparency, good adhesion to substrates, and fusing characteristics, such as the ability to be fixed to paper at relatively low fusing temperatures while not permanently adhering to fusing rolls, except at relatively high temperatures. As used herein, the term, "polyester", is intended to mean a polymer in which backbone recurring units are connected by ester linkages. As is well known, polyesters useful as binder materials in toner particles can be linear, branched, or lightly crosslinked and can be fashioned from any of many different monomers, typically by polycondensation of monomers containing two or more carboxylic acid groups (or derivatives thereof, such as anhydride or ester groups) with monomers containing two or more hydroxyl groups.

Also, toner particles in dry developers often contain material referred to as a charge agent or charge-control agent, which helps to establish and maintain toner charge within an acceptable range. Many types of charge-control agents have been used and are described in the published patent literature.

One general type of charge-control agent known to be useful in polyester toner particles for dry developers comprises a quaternary phosphonium salt. A number of such quaternary phosphonium salt charge-control agents are described, for example, in U.S. Pat. Nos. 4,496,643 and 4,537,848. Unfortunately, many of those known charge-control agents can exhibit a number of drawbacks in some developers.

For example, some of the known quaternary phosphonium salt charge agents lack thermal stability and, thus, totally or partially decompose during attempts to mix them with known toner binder materials in well-known processes of preparing toners by mixing addenda with molten toner binders. Such processes are often referred to as melt-blending or melt-compounding processes and are commonly carried out at elevated temperatures. Thus, charge agents that are thermally unstable at temperatures encountered during melt-compounding can exhibit this decomposition problem.

Also, some of the known quaternary phosphonium salt charge-control agents have relatively high melting points. During melt-blending, a molten charge agent can be more quickly, efficiently, and uniformly dispersed in the molten toner binder than can a solid charge agent. Non-uniform dispersion can result in poor or inconsistent charge-control performance from toner particle to toner particle (among other undesirable effects discussed below). Therefore, it is a drawback to have a charge agent that will not become molten at the temperatures that will be encountered in melt-compounding, because such a charge agent will be slowly, inefficiently, and non-uniformly dispersed in the toner binder during some melt-blending processes.

Furthermore, some of the known quaternary phosphonium salt charge agents have relatively high electrical conductivity, which can lead to poor performance of some developers.

Also, some known quaternary phosphonium salt charge agents exhibit high sensitivity to changes in environmental relative humidity and/or temperature, which can lead to erratic performance of the charge agents under changing environmental conditions.

Additionally, some of the known quaternary phosphonium salt charge agents will adversely interact chemically and/or physically with other developer or copier components. For example, some will interact with carrier or carrier coating materials (e.g., fluorohydrocarbon polymer coatings such as poly(vinylidene fluoride)) and lead to premature carrier aging and shortened useful developer life. Some will interact with certain toner colorants to cause unacceptable hue shifts in the toner. Some will interact with copier fuser rollers (e.g., rollers coated with fluorohydrocarbon polymers such as poly(vinylidene fluoride-co-hexafluoropropylene)) to cause premature failure of the copier's toner fusing system. Some will interact with surface layers of electrostatographic elements to cause poor latent image formation and shortened useful element life.

Also, poor dispersibility of some of the known quaternary ammonium salt charge agents in some of the known polyester toner binder materials, either because the charge agent remains solid during melt-compounding (as discussed above) or undergoes phase separation from the toner binder when it is attempted to increase its concentration therein, or because it is incompatible with or otherwise poorly dispersible in the binder, can lead to worsening of some of the problems mentioned above. Non-uniform dispersion of charge agent means that higher concentrations or agglomerations of charge agent will exist in some portions of the toner binder mix, compared to others. In typical melt-blending processes, the toner mixture is cooled and ground down to desired particle size after melt-blending. Agglomerations of charge agent provide sites in the mixture where fracture is more likely to occur during grinding. The new surfaces created by such fracture will have a higher concentration of charge agent than will internal sites. Thus, the final toner particles will have a higher surface concentration of charge agent than internal concentration. It should be readily appreciated that if a charge agent tends to adversely interact with the environment, copier components, or other developer components, higher surface concentrations of charge agent on the toner particles will lead to a greater degree of such interaction, thus exacerbating problems such as high conductivity, high environmental sensitivity, and premature failure of carrier and copier component materials.

Furthermore, in the known dry developers containing known quaternary phosphonium salt charge-control agents in toner particles, the charge-control agents are not chemically bonded to the other toner components, e.g., the polymeric binders. Therefore, the charge-control agents can migrate within, and exude from, the toner particles over time, causing non-uniform dispersion, inconsistent and changing toner charge, and worsening of adverse interactions noted above.

Also, many of the known quaternary phosphonium salt charge-control agents are not as efficient at creating the desired charge level as is desirable; i.e., it requires a relatively high concentration of the charge-control agent to produce the desired charge level. The greater the concentration of charge-control agent required, the greater will be the chance of phase separation and non-uniform dispersion, the greater will be the chance of adverse interactions and poor or inconsistent charging, and the greater will be the cost of the charge-control agent required per unit amount of toner.

Additionally, with many of the known quaternary phosphonium salt charge-control agents, the ability to produce changes in charge level by increasing charge-control agent concentration, falls off relatively quickly, i.e., a plateau of charge level versus concentration is reached, and this may occur before the charge reaches the desired level. In that case, no matter how much more the concentration of charge-control agent is increased, the desired charge level will never be achieved.

It would, therefore, be desirable to provide new quaternary phosphonium salt compositions that could be used to form new polyester toner particles and to perform the charge-controlling function well therein, while avoiding or minimizing all of the drawbacks noted above. The present invention does this.

SUMMARY OF THE INVENTION

The invention provides new polyesters containing a quaternary phosphonium salt comprising a cationic portion and an anionic portion, wherein the cationic portion of the salt comprises a phosphorous atom directly covalently bonded to at least one aryl moiety substituted with a group having an ester linkage to the rest of the polyester, and wherein the anionic portion of the salt comprises an arylsulfonate moiety in which the aryl group is unsubstituted or is substituted with one or more alkyl, halide, or group having an ester linkage to the rest of the polyester.

These polyesters can be used as dual function binder/charge-control agents in electrostatographic toner particles and have a number of advantages over the combinations of polyester binders and quaternary phosphonium salt charge-control agents described in the prior art.

The inventive polyesters have good thermal stability. Neither the polyesters as a whole, nor their quaternary phosphonium salt portions will thermally decompose during processes of melt-blending them with other addenda which it may be desirable to include in toner particles (e.g., other binders, colorants, release agents, etc.). They do not exhibit unacceptably high conductivity or environmental sensitivity.

When employed in toner particles, these polyesters have not been found to interact unacceptably with commonly utilized toner colorants, carrier materials, or copier components such as fuser rolls and electrophotographic elements.

When used as the sole binder/charge-control agent in a toner particle, there is, of course, no problem of lack of compatibility with other binders. When it is desired to additionally include another binder polyester in the toner particles, both polyesters can easily be fashioned to provide good compatibility with each other (most easily by choosing some of the recurring units of both polyesters to be the same or similar or by choosing recurring units that are already known to provide good compatibility when included in polyesters intended to be blended together). Since the quaternary phosphonium salt charge-control moiety is covalently bonded to the polyester, there is no problem of dispersibility, and no such problems have been found to arise when the polyester is mixed with another compatible polyester binder, when desired.

Also because the phosphonium moiety is covalently bonded to the polyester, there is no migration within, or exuding of the charge-control moiety from, the toner composition.

Furthermore, it has been unexpectedly found that the covalent bonding of the cationic portion of the phosphonium salt to the polyester provides not only a good charge-control material, but one that is significantly more efficient (i.e., provides the desired charge level at a much lower concentration of the phosphonium salt moiety) than the corresponding prior art non-bonded mixtures of polyesters and non-polymeric quaternary phosphonium salt charge-control agents or than corresponding polyesters wherein only the anionic portion of the phosphonium salt is covalently bonded to the polyester. Also, there is, therefore, less chance of mixing problems or adverse interactions.

Along with their greater charge-control efficiency, the new polyesters are also more capable of achieving desired charge levels than the corresponding non-polymeric phosphonium charge agents; i.e., greater changes in charge level are achievable by increasing the phosphonium salt moiety concentration than are possible with the non-polymeric phosphonium charge agents, which tend to plateau at a lesser change in charge level. Also, if desired, greater concentrations of the phosphonium salt charge-control moiety can be included in toner particles than with the prior art non-polymeric salts, since there is no problem of phase separation at higher concentrations.

An additional advantageous feature of the new polyesters is that they can be prepared by known melt-polycondensation techniques, rather than having to use more complex solution-polycondensation techniques wherein additional steps must be taken to isolate the polyester from solvents. This is because the monomers (including the phosphonium salt-containing monomers) needed to produce the polyesters are capable of experiencing the relatively harsh thermal environment (e.g., 220°–240° C.) of melt-phase synthesis for necessarily prolonged periods (e.g., up to 5 or 6 hours) without undergoing thermal degradation.

It should be noted that inventive toners and developers containing the phosphonium polyesters of this invention or other phosphonium polymers, are described and claimed in copending U.S. patent application Nos. 229,043, 229,045, 229,046, and 229,047, all filed of even date herewith.

DESCRIPTION OF PREFERRED EMBODIMENTS

A polyester of this invention comprises any of the recurring units known to be useful in polyester toner binders in general, with the additional proviso that the polyester contains a quaternary phosphonium salt comprising a cationic portion and an anionic portion, wherein the cationic portion of the salt comprises a phosphorous atom directly covalently bonded to at least one aryl moiety substituted with a group having an ester linkage to the rest of the polyester, and wherein the anionic portion of the salt comprises an arylsulfonate moiety in which the aryl group is unsubstituted or is substituted with one or more alkyl, halogen, or group having an ester linkage to the rest of the polyester.

While the cationic phosphonium moiety is monovalently bonded to the rest of the polyester through one ester linkage in some embodiments (as an endcapping unit or pendant unit), in other embodiments it is divalently incorporated into the backbone of the polyester as a recurring backbone unit (either through two ester linkages which are substituents of one aryl moiety to which a cationic phosphonium atom is directly covalently bonded or through two ester linkages, which are substituents of two separate aryl moieties to which a cationic phosphonium atom is directly covalently bonded), and in still other embodiments the cationic phosphonium moiety is trivalently bonded into the polyester through three ester linkages to form a recurring backbone unit that also serves as a branching or crosslinking site.

Also, in addition to being ionically bonded to the cationic phosphonium portion to form the phosphonium salt, the anionic arylsulfonate portion of the salt can optionally also be covalently bonded to the rest of the polyester, either monovalently or divalently, through one or more ester linkages contained in one or more substituents on the aryl portion of the arylsulfonate.

In all of the embodiments mentioned above the polyester has the superior charge-control capabilities previously described, apparently because of the covalent bonding of the cationic portion of the phosphonium salt to the rest of the polyester.

In some preferred embodiments of the inventive polyesters the phosphonium salt has the structure

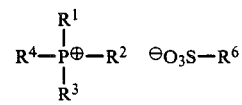   I or the structure

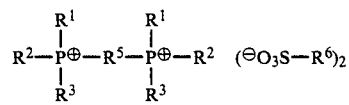   II wherein:
$R^1$, $R^2$, $R^3$, and $R^4$ are each independently: alkyl which is unsubstituted or substituted with one or more aryl; or aryl which is unsubstituted, substituted with one or more alkyl, or substituted with one or more group containing an ester linkage to the rest of the polyester;

$R^5$ is alkylene, oxydialkylene, or arylenedialkylene; and $R^6$ is aryl which is unsubstituted or substituted with one or more alkyl, halide, or group containing an ester linkage to the rest of the polyester; with the provisos that:

each alkyl or alkylene moiety recited above has from 1 to 20 carbon atoms;

each aryl or arylene moiety recited above has from 6 to 14 carbon atoms; and at least one of $R^1$, $R^2$, $R^3$, and $R^4$ contains at least one ester linkage to the rest of the polyester.

A polyester of the present invention can be prepared by any of the known polycondensation techniques for producing polyesters, e.g., solution polycondensation or melt-phase polycondensation. Melt-polycondensation is the preferred technique, because it requires no isolation of product from solvents, and the monomers useful to prepare the inventive polyester will not degrade in the harsh thermal environment required.

Monomers useful to prepare the inventive polyesters contain groups functional to produce ester linkages, e.g., carboxylic acid, ester, anhydride, hydroxy, epoxide, etc. Monomers useful to prepare backbone recurring units contain two or more such groups, while monomers intended to form endcaps or pendant units can contain just one. The quaternary phosphonium salts are most conveniently incorporated in the form of monomers of these types during the polycondensation, but they can also be appended to functionalized sites after polymerization if desired.

Other than the phosphonium salt-containing monomers needed, other monomers useful in preparing the inventive polyesters are any of those known to be useful in general to prepare polyester binders for toner particles. Some specific examples of such monomers are: 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol; norbornylene glycol; decahydro-2,6-naphthalenedimethanol; glycerol; bisphenol A; ethylene glycol; diethylene glycol; triethylene glycol; 1,2-propanediol; 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,2,4-trimethyl-1,6-hexanediol; 4-oxa-2,6-heptanediol; 1,4-bis(2-hydroxyethoxy)cyclohexane; 2,2-dimethyl-1,3-dihydroxypropane; succinic acid; sebacic acid; 2-methyladipic acid; diglycolic acid; thiodiglycolic acid; fumaric acid; cyclohexane-1,3-dicarboxylic acid; cyclohexane-1,4-dicarboxylic acid; cyclopentane-1,3-dicarboxylic acid; 2,5-norbornanedicarboxylic acid; phthalic acid; isophthalic acid; terephthalic acid; 2-butylisophthalic acid; 2,6-naphthalenedicarboyxlic acid; 1,4-naphthalenedicarboxylic acid; 1,5-napthalenedicarboxylic acid; 4,4'-sulfonyldibenzoic acid; 4,4'-oxydibenzoic acid; binaphthyldicarboxylic acid; 9,10-triptycenedicarboxylic acid; and the anhydrides and lower alkyl esters of the acids mentioned.

Some specific examples of phosphonium salt-containing monomers useful in preparing the inventive polyesters are:

methylphenylbis(4-carbomethoxyphenyl)phosphonium 3,5-bis(carbomethoxy)benzenesulfonate;

4-carbomethoxyphenylmethyldiphenylphosphonium 3,5-bis(carbomethoxy)benzenesulfonate;

4-carbomethoxyphenylmethyldiphenylphosphonium p-toluenesulfonate;

methylbis(4-carbomethoxyphenyl)phenylphosphonium p-toluenesulfonate;

methylbis(4-acetoxyphenyl)phenylphosphonium p-toluenesulfonate;

methylbis(4-hydroxyphenyl)phenylphosphonium p-toluenesulfonate;

4-acetoxyphenylmethyldiphenylphosphonium p-toluenesulfonate;

methyltris(4-acetoxyphenyl)phosphonium p-toluenesulfonate;

ethylenebis(4-hydroxyphenyldiphenylphosphonium) di-p-toluenesulfonate;

methyltris(4-carbomethoxyphenyl)phosphonium p-toluenesulfonate;

ethylenebis(4-carbomethoxyphenyldiphenylphosphonium) di-p-toluenesulfonate;

oxydiethylenebis(4-acetoxyphenyldiphenylphosphonium) di-p-toluenesulfonate;

ethylenebis(4-acetoxyphenyldiphenylphosphonium) di-p-toluenesulfonate;

3,5-dicarbomethoxyphenylmethyldiphenylphosphonium p-toluenesulfonate; and xylylenebis(4-acetoxyphenyldiphenylphosphonium) di-p-toluenesulfonate.

Useful functionalized quaternary phosphonium salt-containing monomers (i.e., those containing the groups necessary to form ester linkages) are prepared by well-known methods of either reacting appropriate functionalized tertiary phosphines with appropriate alkylating agents (e.g., the arylsulfonates) or reacting functionalized alkylating agents with tertiary phosphines, preferably the former. The bisphosphonium salts are readily obtained by using alkylating agents having two reactive sites. If the alkylating agents employed are halides, the phosphonium halide is readily converted into the phosphonium arylsulfonate by ion exchange with the sodium or silver salt of the appropriate arylsulfonic acid. Any desired functionalized tertiary phosphines not readily available can be prepared by known methods described in the general literature.

Further details of preparation of some of the preferred embodiments are included in the Preparations and Examples below.

Preferred embodiments of the inventive polyesters for use as dual function binder/charge-control agents in electrostatographic toner particles are amorphous polyesters having a glass transition temperature (referred to as Tg) in the range of about 40° to about 150° C., and more preferably about 50° to about 120° C. Such polyesters can be heat-fixed to smooth-surfaced film substrates as well as to more conventional substrates, such as paper, without difficulty. Tg can be determined by any conventional method, e.g., differential scanning calorimetry.

Preferred embodiments of the polyesters also have inherent viscosity in the range of about 0.01 to about 0.65 deciliters per gram (dl/g), as measured at 25° C. and at a concentration of 2.5 g/l in a solution of dichloromethane (DCM), dimethylformamide (DMF), or a 1:1 by weight mix of phenol:chlorobenzene (P:CB).

To perform the charge-control function in an electrostatographic toner particle, an inventive polyester will usually be included in the toner particle in an amount sufficient to yield a concentration of individual phosphonium salt portions of the polyester in the range of about $10^{-9}$ to about $10^{-4}$ moles of phosphonium salt moieties per gram of all material in the toner particle. The exact concentration employed will depend on the level of charge desired and the triboelectric nature of the inventive polyester and all other materials in the toner particle (and also the triboelectric nature of the carrier particles, if the toner particles are intended to be mixed with carrier particles to form a so-called "two-component" electrostatographic developer). The inventive polyesters can also be used as binder/charge-control agents in toner particles intended to be used by themselves (i.e., with no carrier particles) as a so-called "single component" electrostatographic developer.

It should be appreciated that the desired concentration of phosphonium salt moieties in the toner particle can be effected in more than one manner. In cases where the toner particle consists of only the inventive polyester, the moles of phosphonium salt moieties per gram of toner particle will be equal to the moles of phosphonium salt-containing units per gram of polyester. In cases where other materials (e.g., other binders, colorants, release agents, etc.) are additionally included in the toner particle, the moles of phosphonium salt-containing units per gram of polyester must be higher than the moles of phosphonium salt moieties per gram of toner particle to compensate for the additional weight of other materials in the particle. Thus, inventive polyesters useful in toner particles, include not only those in which phosphonium salt-containing units are included in a concentration range of $10^{-9}$ to $10^{-4}$ moles per gram of polyester, but also others in which the concentration of phosphonium salt-containing units is considerably higher than that range.

As noted above, the inventive polyesters can be included in toner particles that additionally contain other materials, such as other binders, colorants, release agents, etc.

Other binders which can be mixed with the inventive polyesters in toner particles include any of the polymers known to be useful as toner binders and also other polyesters containing quaternary phosphonium salts, wherein only the anionic portion of the salt is covalently bonded to the polyester through an ester linkage. These other polyesters generally provide charge levels lower than the polyesters of the present invention at a given concentration of phosphonium salt moieties, but they can be useful to downwardly adjust the charge level provided by the inventive polyesters when mixed therewith, if desired.

Among the various other polymeric binders which can be mixed with the inventive polyesters in toner particles are other polyesters (including polycarbonates), polyamides, phenol-formaldehyde polymers, polyesteramides, alkyd resins, and vinyl-addition polymers and copolymers, typically formed from monomers such as styrenes, butadiene, acrylates and methacrylates, among others. For further descriptions of some of these other polymeric binders, see, for example, U.S. Pat. Nos. 3,809,554; Re 31,072; 3,694,359; 2,917,460; 2,788,288; 2,638,416; 2,618,552; 4,416,965; 4,691,966; and 2,659,670.

Numerous colorant materials selected from dyestuffs or pigments can be employed in toners containing the inventive polyesters. Such materials serve to color the toner and/or render it more visible. Of course, suitable toner material having the appropriate charging characteristics can be prepared without the use of a colorant material where it is desired to have a developed image of low optical density. In those instances where it is desired to utilize a colorant, the colorants can, in principle, be selected from virtually any of the compounds mentioned in the Colour Index Volumes 1 and 2, Second Edition.

Included among the vast number of useful colorants are such materials as Hansa Yellow G (C.I. 11680), Nigrosine Spirit soluble (C.I. 50415), Chromogen Black ETOO (C.I. 45170), Solvent Black 3 (C.I. 26150), Fuchsine N (C.I. 42510), C.I. Basic Blue 9 (C.I. 52015). Carbon black also provides a useful colorant. The amount of colorant added may vary over a wide range, for example, from about 1 to about 20 percent of the weight of the polymer. Particularly good results are obtained when the amount is from about 1 to about 10 percent.

To be utilized as a binder/charge-control agent in electrostatographic toners, the inventive polyester is mixed in any convenient manner (preferably by melt-blending as described, for example, in U.S. Pat. Nos. 4,684,596 and 4,394,430) with any other desired addenda, and the mix is then ground to desired size to form a free-flowing powder of toner particles containing the polyester.

Such toner particles can have an average diameter between about 0.01 $\mu$m and about 100 $\mu$m, a value in the range from about 1.0 to about 30 $\mu$m being preferable for many currently used machines. However, larger or smaller particles may be needed for particular methods of development or development conditions.

To be utilized as toners in electrostatographic developers, toners containing polyesters of this invention can be mixed with a carrier vehicle. The carrier vehicles which can be used to form such developer compositions can be selected from various materials. Such materials include carrier core particles and core particles overcoated with a thin layer of film-forming resin.

The carrier core materials can comprise conductive, non-conductive, magnetic, or non-magnetic materials. For example, carrier cores can comprise glass beads; crystals of inorganic salts such as aluminum potassium chloride; other salts such as ammonium chloride or sodium nitrate; granular zircon; granular silicon; silicon dioxide; hard resin particles such as poly(methyl methacrylate); metallic materials such as iron, steel, nickel, carborundum, cobalt, oxidized iron; or mixtures or alloys of any of the foregoing. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See, for example, U.S. Pat. Nos. 4,042,518; 4,478,925; and 4,546,060.

As noted above, the carrier particles can be overcoated with a thin layer of a film-forming resin for the purpose of establishing the correct triboelectric relationship and charge level with the toner employed. Examples of suitable resins are the polymers described in U.S. Pat. Nos. 3,547,822; 3,632,512; 3,795,618 and 3,898,170 and Belgian Pat. No. 797,132. Other useful resins are fluorocarbons such as polytetrafluoroethylene, poly(vinylidene fluoride), mixtures of these, and copolymers of vinylidene fluoride and tetrafluoroethylene. See, for example, U.S. Pat. Nos. 4,545,060; 4,478,925; 4,076,857; and 3,970,571. Such polymeric fluorohydrocarbon carrier coatings can serve a number of known purposes. One such purpose can be to aid the developer to meet the electrostatic force requirements mentioned above by shifting the carrier particles to a position in the triboelectric series different from that of the uncoated carrier core material, in order to adjust the degree of triboelectric charging of both the carrier and toner particles. Another purpose can be to reduce the frictional characteristics of the carrier particles in order to improve developer flow properties. Still another purpose can be to reduce the surface hardness of the carrier particles so that they are less likely to break apart during use and less likely to abrade surfaces (e.g., photoconductive element surfaces) that they contact during use. Yet another purpose can be to reduce the tendency of toner material or other developer additives to become undesirably permanently adhered to carrier surfaces during developer use (often referred to as scumming). A further purpose can be to alter the electrical resistance of the carrier particles.

A typical developer composition containing the above-described toner and a carrier vehicle generally comprises from about 1 to about 20 percent by weight of particulate toner particles and from about 80 to 99 percent by weight carrier particles. Usually, the carrier particles are larger than the toner particles. Conventional carrier particles have a particle size on the order of from about 20 to about 1200 microns, preferably 30–300 microns.

Alternatively, toners containing polyesters of the present invention can be used in a single component developer, i.e., with no carrier particles.

Toner and developer compositions containing polyesters of this invention can be used in a variety of ways to develop electrostatic charge patterns or latent images. Such developable charge patterns can be prepared by a number of means and be carried for example, on a light sensitive photoconductive element or a non-light-sensitive dielectric-surfaced element such as an insulator-coated conductive sheet. One suitable development technique involves cascading the developer composition across the electrostatic charge pattern, while another technique involves applying toner particles from a magnetic brush. This latter technique involves the use of a magnetically attractable carrier vehicle in forming the developer composition. After imagewise deposition of the toner particles, the image can be fixed, e.g., by heating the toner to cause it to fuse to the substrate carrying the toner. If desired, the unfused image can be transferred to a receiver such as a blank sheet of copy paper and then fused to form a permanent image.

The following preparations and examples are presented to further illustrate the preparation and performance of some preferred embodiments of the polyesters of the invention and to compare their properties and performance to those of polyesters, charge agents, toners, and developers outside the scope of the invention.

In the preparations and examples below polyester names contain an indication of the molar ratios of the various units in the polyester. In some examples (as indicated therein) the relative concentrations of units are expressed as molar ratios of the monomers used to prepare the polyester.

Where toner charge in a developer is indicated, usually as microcoulombs per gram of toner particles ($\mu c/g$), the charge was sometimes determined by plating the toner by electrical bias from a magnetic brush of the developer onto the electrically insulating layer of a test element. This element was composed of, in sequence, a film support, an electrically conducting layer and the insulating layer. The amount of plating was usually controlled to produce a mid-range reflection optical density (OD). For purposes of the present invention, toner containing colorant was plated to an OD of about 0.3. The test element containing the plated toner was connected via the conducting layer to an electrometer. The plated toner was then rapidly removed in a current of forced air, causing a flow of current to register in the electrometer as a charge, in microcoulombs. The registered charge was divided by the weight of the plated toner to obtain the charge per mass of toner. This charge measurement method is referred to as the "Blowoff" method.

In some cases toner charge was measured by a technique referred to as the "MECCA" method, wherein the apparatus consists of two parallel metal plates separated by insulating posts about 1 cm high. An AC electromagnet is located beneath the lower plate to provide magnetic agitation, while a DC electric potential of about 2000 volts can be applied across the plates. A sample of about 0.1 gram of developer is weighed, placed on the lower plate, and charged by magnetic agitation for 30 sec. Next, both the electric and magnetic fields are applied for 30 sec. The toner is separated from the carrier by the combined agitation and electric field and is transported to the upper plate by the electric field. The charge on the toner collected by the top plate is measured in microcoulombs by an electrometer, and the weight of toner is determined. Charge is expressed as microcoulombs per gram of toner ($\mu c/g$).

Preparation 1

3,5-Dimethylphenyldiphenylphosphine

In a 3-neck 1 liter flask equipped with blade stirrer, nitrogen inlet, Claissen adaptor, condenser, drying tube and constant pressure dropping funnel, was placed 6.67 g (0.274 g atoms) of magnesium turnings. Under a nitrogen flow, the glassware was dried with heating via a heat gun. To the magnesium was added a portion of a solution of 55.5 g (0.30 mol) of 5-bromo-m-xylene in 150 ml dry THF (tetrahydrofuran). Reaction was initiated with external heating and the balance of the solution was added dropwise over approximately 30 min, maintaining gentle reflux. The mixture was then stirred for another 1 hr after which a solution of 41.3 g (0.188 mol) of chlorodiphenylphosphine in 150 ml of dry THF was added over approximately 10 min. The mixture was then heated at reflux for 2 hr, cooled and poured into ice. The mixture was neutralized with concentrated HCl and nitrogen was bubbled through the mixture overnight. The organic layer was taken up in methylene chloride and separated from the aqueous layer. Concentrating the organic layer afforded an oil which crystallized on standing. After triturating with an equal volume of methanol, the solid was collected and recrystallized from methanol. The yield of 3,5-dimethylphenyldiphenylphosphine was 37.5 g (68.7% of theory); mp=67°–9° C.

Anal. Calcd. for $C_2H_{19}P$: C, 82.7; H, 6.6; P, 10.7. Found: C, 83.2; H, 6.7; P, 10.7.

Preparation 2

3,5-Dicarboxyphenyldiphenylphosphine Oxide

To a mixture of 30.0 g (0.1033 mol) of 3,5-dimethylphenyldiphenylphosphine (from Preparation 1), 125 ml of pyridine and 75 ml of water heated on a steam bath was added 233.9 g (1.48 mol) of potassium permanganate portionwise. After completion of addition, the mixture was stirred for another 1.5 hr and cooled. Methanol (100 ml) was added and the mixture was stirred for 15 min. The mixture was filtered and the manganese dioxide was washed with water. The combined filtrate and wash was acidified with concentrated hydrochloric acid and the solid precipitate was collected, washed with water and dried. The yield of 3,5-dicarboxyphenyldiphenylphosphine oxide was 22.7 g (60.0% of theory); mp=283°–6° C.

Anal. Calcd. for $C_{20}H_{15}PO_5$: C, 65.6; H, 4.1; O, 21.8; P, 8.5. Found: C, 65.6; H, 4.2; O, 21.6; P, 8.6.

Structure confirmed by NMR.

Preparation 3

3,5-Dicarbomethoxyphenyldiphenylphosphine Oxide

A mixture of 20.0 g ($5.46 \times 10^{-2}$ mol) of 3,5-dicarboxyphenyldiphenylphosphine oxide (from Preparation 2), 134 ml of methanol and 1.5 ml of concentrated $H_2SO_4$ was heated at reflux for 18 hr and cooled. The solution was then poured into dilute sodium bicarbonate to give a white precipitate which was collected, washed with water and dried. The yield of 3,5-dicarbomethoxyphenyldiphenylphosphine oxide was 18.9 g (87.8% of theory); mp=170°-1° C.

Anal. Calcd. for $C_{22}H_{19}O_5P$: C, 67.0; H, 4.9; P, 7.9. Found: C, 67.0; H, 4.8; P, 7.9.

Structure confirmed by NMR.

Preparation 4

3,5-Dicarbomethoxyphenyldiphenylphosphine

To a mixture of 17.0 g ($4.31 \times 10^{-2}$ mol) of 3,5-dicarbomethoxyphenyldiphenylphosphine oxide (from Preparation 3), 4.71 g ($4.65 \times 10^{-2}$ mol) of triethylamine and 196 ml of dry toluene under nitrogen was added 6.76 g ($4.74 \times 10^{-2}$ mol) of trichlorosilane. The mixture was then heated at reflux for 15.25 hr and cooled. A solution of 20% sodium hydroxide (49 ml) was added and the mixture was stirred. The organic layer was separated, washed with two 250 ml portions of water, dried over $MgSO_4$ and concentrated to an oil which crystallized. The solid was recrystallized twice from methanol and dried. The yield of 3,5-dicarbomethoxyphenyldiphenylphosphine was 14.0 g (85.8% of theory); mp=103°-4.5° C.

Anal. Calcd. for $C_{22}H_{19}O_4P$: C, 69.8; H, 5.1; O, 16.9; P, 8.2. Found: C, 71.0; H, 5.2; O, 16.8; P, 8.0.

Structure confirmed by NMR.

Preparation 5

Methyl[3,5-bis(carbomethoxy)phenyl]diphenylphosphonium p-toluenesulfonate

A mixture of 9.46 g ($2.5 \times 10^{-2}$ mol) of 3,5-dicarbomethoxyphenyldiphenylphosphine (from Preparation 4), and 4.66 g ($2.5 \times 10^{-2}$ mol) of methyl p-toluenesulfonate was heated in a 130° C. bath with nitrogen bubbling through the melt for two hours. The resultant product was cooled to an amorphous glass.

Anal. Calcd. for $C_{30}H_{29}O_7PS$: C, 63.8; H, 5.2; P, 5.5; S, 5.7. Found: C, 62.7; H, 5.1; P, 5.5; S, 5.9.

Structure confirmed by NMR.

Preparation 6

Bis(4-acetoxyphenyl)phenylphosphine

A mixture of 18.76 g (0.05 mol) of bis(4-hydroxyphenyl)phenylphosphine hydrobromide, 9.1 g (0.11 mol) of sodium acetate and 61 ml of acetic anhydride was heated at reflux for 4 hr and cooled. The mixture was poured onto a mixture of ice and water and the resultant solid was collected and recrystallized from methanol. The yield of bis(4-acetoxyphenyl)phenylphosphine was 4.9 g (25.9% of theory); mp=118°-20° C.

Anal. Calcd. for $C_{22}H_{19}O_4P$: C, 69.8; H, 5.1; P, 8.2. Found: C, 70.0; H, 5.2; P, 7.9.

Structure confirmed by NMR.

Preparation 7

Methylbis(4-acetoxyphenyl)phenylphosphonium p-toluenesulfonate

A mixture of 37.8 g (0.10 mol) of bis(4-acetoxyphenyl)phenylphosphine (from Preparation 6) and 18.6 g (0.10 mol) of methyl p-toluenesulfonate was heated with stirring under nitrogen in a 125°-135° C. oil bath for one hour. The resultant syrup was then cooled to an amorphous glass. The yield of methylbis(4-acetoxyphenyl)phenylphosphonium p-toluenesulfonate was 55.1 g (97.6% of theory).

Anal. Calcd. for $C_{30}H_{29}O_7PS$: C, 63.8; H, 5.2; P, 5.5; S, 5.7. Found: C, 63.5; H, 5.3; P, 5.3; S, 5.6.

Structure confirmed by NMR.

Preparation 8

1,4-Xylylenebis(4-acetoxyphenyldiphenylphosphonium) Di-p-toluenesulfonate

A solution of 4.8 g ($17.24 \times 10^{-3}$ mol) of silver p-toluenesulfonate in 50 ml of 1:1 methanol:$H_2O$ was added to a solution of 7.8 g ($8.62 \times 10^{-3}$ mol) of 1,4-xylylenebis(4-acetoxyphenyldiphenylphosphonium)dibromide. A greenish-white precipitate formed immediately. After stirring for another 5 min, the mixture was filtered and the filtrate was concentrated to a glassy residue. The glass was washed with ether and dried. The yield of 1,4-xylylenebis(4-acetoxyphenyldiphenylphosphonium) di-p-toluenesulfonate was 7.5 g (80.0% of theory).

Anal. Calcd. for $C_{62}H_{56}O_{10}P_2S_2$: C, 68.5; H, 5.2; P, 5.7; S, 5.9. Found: C, 67.5; H, 5.2; P, 5.4; S, 6.0

Structure confirmed by NMR.

Preparation 9

Ethylenebis(4-carbomethoxyphenyldiphenylphosphonium) di-p-toluenesulfonate

A mixture of 3.20 g (0.01 mol) of (4-carbomethoxyphenyl)diphenylphosphine and 1.85 g (0.005 mol) of 1,2-bis(p-toluenesulfonyloxy)ethane was heated in a 130° C. bath with stirring for 12.75 hr and cooled to an amorphous glass.

Anal. Calcd. for $C_{56}H_{52}O_{10}P_2S_2$: C, 66.5; H, 5.2; P, 6.1; S, 6.3. Found: C, 66.2; H, 5.2; P, 6.0; S, 6.7.

Structure confirmed by NMR.

Preparation 10

Bis(p-carbomethoxyphenyl)phenylmethylphosphonium p-toluenesulfonate

A mixture of 18.92 g (0.05 mol) of bis(p-carbomethoxyphenyl)phenylphosphine and 9.31 g (0.05 mol) of methyl p-toluenesulfonate was heated in a 130° C. bath for 1 hr with stirring. The viscous material was cooled to an amorphous glass which was hygroscopic. The yield of bis(p-carbomethoxyphenyl)phenylmethylphosphonium p-toluenesulfonate was 26.1 g (92.5% of theory).

Anal. Calcd. for $C_{30}H_{29}O_7PS$: C, 63.8; H, 5.2; P, 5.5; S, 5.7. Found: C, 62.9; H, 5.2; P, 5.5; S, 5.7.

Structure confirmed by NMR.

Preparation 11

4-carbomethoxyphenylmethyldiphenylphosphonium 3,5-bis(carbomethoxy)benzenesulfonate A mixture of 16.0 g (0.05 mol) of p-carbomethoxyphenyldiphenylphosphine and 14.41 g (0.05 mol) of methyl 3,5-bis(carbomethoxy)benzenesulfonate was heated in a 130° C. bath with nitrogen bubbling through the melt for 2.5 hours.

Anal. Calcd. for $C_{31}H_{29}O_9PS$: C, 61.2; H, 4.8; P, 5.1; S, 5.3. Found: C, 61.3; H, 4.9; P, 5.0; S, 5.5.

Preparation 12

Methylbis(4-carbomethoxyphenyl)phenylphosphonium 3,5-bis(carbomethoxy)benzenesulfonate A mixture of 14.414 g (0.05 mol) of methyl 3,5-bis(-carbomethoxy)benzenesulfonate and 19.368 g (0.05 mol) bis(4-carbomethoxyphenyl)phenylphosphine was heated in a 130° C. bath with nitrogen bubbling through the melt for 2 hours.

Anal. Calcd. for $C_{33}H_3$, $O_{11}PS$: C, 59.5; H, 4.7; P, 4.6; S, 4.8. Found: C, 59.6; H, 4.7; P, 4.7; S, 5.1.

Structure confirmed by NMR.

EXAMPLE 1

Poly(neopentylene-co-pentaerythrityl 94.875/2.5 terephthalate-co-adipate-co-methyldiphenylphosphonium-4-benzoate p-toluenesulfonate 94.75/5/0.25)

A mixture of 73.6 g (0.379 mol) of dimethyl tereptha-late, 3.5 g (0.02 mol) of dimethyl adipate, 58.3 g (0.56 mol) of neopentyl glycol, 0.51 g (0.001 mol) of methyl(4-carbomethoxyphenyl)diphenylphosphonium p-toluenesulfonate and 1.36 g (0.01 mol) of pentaerythritol was heated in a polymer flask at 220° C. until molten with nitrogen bubbling through the melt. Tetraisopropyl orthotitanate (4 drops) was added and the mixture was heated at 220° C. for 2 hr then at 240° C. for 1.5 hr. At this time, stirring was initiated and the pressure was reduced to 0.30 mm Hg. Heating at 240° C. was continued for another 2.5 hr. The yield of polymer was 83.5 g. The Tg was found to be 63° C. and the inherent viscosity in methylene chloride was 0.36.

EXAMPLE 2

Poly[neopentylene-co-pentaerythrityl 95/2.5 terephthalate-co-adipate-co-ethylenebis(diphenylphosphonium-4-benzoate) di-p-toluenesulfonate 94.75/5/0.25]

In a polymer flask was placed 73.6 g (0.379 mol) of dimethyl terephthalate, 3.5 g (0.02 mol) of dimethyl adipate, 58.3 g (0.56 mol) of neopentylglycol, 1.01 g of ethylenebis(4-carbomethoxyphenyldiphenylphosphonium)ditosylate and 1.36 g (0.01 mol) of pentaerythritol. The mixture was melted in a 220° C. bath with nitrogen bubbling through the melt and 4 drops of tetraisopropyl orthotitanate was added. The mixture was heated for 2 hr at 220° C. and 1 hr at 240° C. The pressure was then reduced to 0.20 mm and with stirring, the mixture was heated at 240° C. for 2.5 hr and cooled. The inherent viscosity in methylene chloride was determined to be 0.34 and the Tg was found to be 61° C.

EXAMPLE 3

Poly[neopentylene terephthalate-co-adipate-co-methylphosphoniumtris(4-benzoate) p-toluenesulfonate 87.5/5/5]

A mixture of 68.0 g (0.35 mol) of dimethyl terephthalate, 2.92 g (0.02 mol) of adipic acid, 12.5 g (0.02 mol) of methyltris(4-carbomethoxyphenyl)phosphonium p-toluenesulfonate and 58.3 g (0.56 mol) of neopentylglycol was heated in a polymer flask at 220° C. until molten under nitrogen. Tetraisopropyl orthotitanate (4 drops) was then added and the mixture was heated at 220° C. for 2 hr, then at 240° C. for 1 hr. With stirring, the pressure was reduced to 0.10 mm Hg, and heating at 240° C. was continued for another 1 hr. The yield of polymer was 83.5 g and the polymer exhibited an inherent viscosity in methylene chloride of 0.44 and a Tg of 66° C.

EXAMPLE 4

Poly[neopentylene-co-pentaerythrityl 95/2.5 terephthalate-co-adipate-co-methylphenylphosphonium bis(4-benzoate) p-toluenesulfonate 93.5/5/1.5]

In a polymer flask was placed 72.6 g (0.374 mol) of dimethyl terephthalate, 3.5 g (0.02 mol) of dimethyl adipate, 3.39 g (0.006 mol) of methylbis(4-carbomethoxyphenyl)phenylphosphonium p-toluenesulfonate, 58.3 g (0.56 mol) of neopentyl glycol and 1.36 g (0.01 mol) of pentaerythritol. The mixture was then heated in a 220° bath until molten at which time 4 drops of tetraisopropyl orthotitanate was added. The mixture was heated at 220° C. for 2 hr with nitrogen bubbling through the melt and then at 240° C. for another 1.25 hr. The mixture was then heated with stirring and an applied vacuum of 0.30 mm Hg for 3.5 hr and cooled. The yield of polymer was 84.5 g. The glass transition temperature was determined to be 65° C. and the inherent viscosity in methylene chloride was determined to be 0.55.

EXAMPLE 5

Poly(neopentylene-co-methylphenyldiphenylenephosphonium p-toluenesulfonate 90/10 isophthalate-co-adipate 90/10)

A mixture of 21.09 g (0.09 mol) of poly(2,2-dimethyl-1,3-propylene isophthalate) (IV=0.30 in phenol:chlorobenzene), 1.46 g (0.01 mol) of adipic acid and 5.65 g (0.01 mol) of methylbis(4-acetoxyphenyl)phenylphosphonium p-toluenesulfonate was heated in a 200° C. bath with nitrogen bubbling through the melt for 2 hr. The mixture was then stirred at reduced pressure (0.30 mm Hg) for another 2 hr at 230° C. and cooled. The glass transition temperature was found to be 60° C. and the inherent viscosity was determined to be 0.25 in phenol:chlorobenzene.

EXAMPLE 6

Poly[neopentylene methylphenylphosphoniumbis(4-benzoate) p-toluenesulfonate]

A mixture of 5.64 g (0.01 mol) of methylbis(4-carbomethoxyphenyl)phenylphosphonium p-toluenesulfonate and 2.08 g (0.02 mol) of neopentyl glycol was heated under nitrogen in a 220° C. bath until molten. Tetraisopropyl orthotitanate (1 drop) was added, and the mixture was heated at 220° C. with nitrogen bubbling through the melt for 2 hr and at 240° C. for 1 hr. Stirring was then initiated and the pressure was reduced to 0.30 mm Hg. Stirring and heating were continued at 240° C. for 2 hr after which the polymer was cooled. The inherent viscosity in methylene chloride was determined to be 0.07 and the Tg was found to be 114° C.

Structure confirmed by NMR.

EXAMPLE 7

Poly[ethylene methylphenylphosphoniumbis(4-benzoate) p-toluenesulfonate]

Preparation was similar to Example 6. Inherent viscosity (i.v.) was 0.05 in dichloromethane (DCM) and Tg was 115° C.

EXAMPLE 8

Poly[1,4-dimethylenecyclohexane methylphenylphosphoniumbis(4-benzoate) p-toluenesulfonate]

Preparation was similar to Example 6. the i.v. was 0.07 in DCM, and Tg was 101° C.

EXAMPLES 9-12

Inventive polyesters were prepared in a manner similar to Example 3, using the monomers neopentyl glycol, dimethyl terephthalate, adipic acid, and methylbis(4-carbomethoxyphenyl)phenylphosphonium p-toluenesulfonate in molar ratios 100/n/5/m, respectively. Results are presented in Table I.

TABLE I

| Example | n | m | i.v. in DCM (dl/g) | Tg(°C.) |
| --- | --- | --- | --- | --- |
| 9 | 94.5 | 0.5 | 0.44 | 64 |
| 10 | 94 | 1.0 | 0.28 | 66 |
| 11 | 93.5 | 1.5 | 0.32 | 67 |
| 12 | 90 | 5.0 | 0.28 | 72 |

EXAMPLES 13-16

Inventive polyesters were prepared in a manner similar to Example 4, using the monomers neopentyl glycol, pentaerythritol, dimethyl terephthalate, dimethyl adipate, and methylbis(4-carbomethoxyphenyl)phenylphosphonium p-toluenesulfonate in molar ratios 95/2.5/n/5/m, respectively. Results are presented in Table II.

TABLE II

| Example | n | m | i.v. in DCM (dl/g) | Tg(°C.) |
| --- | --- | --- | --- | --- |
| 13 | 94.75 | 0.25 | 0.52 | 63 |
| 14 | 98.625 | 0.375 | 0.48 | 63 |
| 15 | 94.5 | 0.5 | 0.71 | 64 |
| 16 | 94 | 1 | 0.52 | 64 |

EXAMPLES 17-19

Inventive polyesters were prepared in a manner similar to Example 4, using the monomers neopentyl glycol, pentaerythritol, dimethyl terephthalate, dimethyl adipate, and methylbis(4-carbomethoxyphenyl)phenylphosphonium p-toluenesulfonate in molar ratios n/m/94.5/5/0.5, respectively. Results are presented in Table III.

TABLE III

| Example | n | m | i.v in DCM (dl/g) | Tg(°C.) |
| --- | --- | --- | --- | --- |
| 17 | 99 | 0.5 | 0.55 | 67 |
| 18 | 98 | 1.0 | 0.55 | 67 |
| 19 | 97 | 1.5 | 0.64 | 67 |

EXAMPLE 20

Poly[1,2-propylene-co-pentaerythrityl 95/2.5 terephthalate-co-adipate-co-methylphenylphosphoniumbis(4-benzoate) p-toluenesulfonate 94.5/5/0.5]

Preparation was similar to Example 4. i.v. in DCM=0.59 dl/g. Tg=72° C.

EXAMPLES 21-22

Inventive polyesters were prepared in a manner similar to Example 4, using the monomers ethylene glycol, 1,4-cyclohexanedimethanol, dimethyl terephthalate, and methylbis(4-carbomethoxyphenyl)phenylphosphonium p-toluenesulfonate in molar ratios 70/30/n/m, respectively. Results are presented in Table IV.

TABLE IV

| Example | n | m | i.v. in DCM (dl/g) | Tg(°C.) |
| --- | --- | --- | --- | --- |
| 21 | 99 | 1 | 0.22 | 68 |
| 22 | 75 | 25 | 0.07 | 46 |

EXAMPLES 23-24

Inventive polyesters were prepared in a manner similar to Example 4, using the monomers diethylene glycol, dimethyl terephthalate, and methylbis(4-carbomethoxyphenyl)phenylphosphonium p-toluenesulfonate in molar ratios 100/n/m, respectively. Results are presented in Table V.

TABLE V

| Example | n | m | i.v. in DCM (dl/g) | Tg(°C.) |
| --- | --- | --- | --- | --- |
| 23 | 95 | 5 | 0.18 | 23 |
| 24 | 80 | 20 | 0.08 | 38 |

EXAMPLE 25

Poly[oxydiethylene-co-neopentylene 20/80 terephthalate-co-methylphenylphosphoniumbis(4-benzoate) p-toluenesulfonate 90/10]

Preparation was similar to Example 4. i.v. in DCM=0.20 dl/g. Tg=75° C.

EXAMPLE 26

Poly[neopentylene-co-pentaerythrityl 95/2.5 terephthalate-co-adipate-co-methylphosphoniumtris(4-benzoate) p-toluenesulfonate 94.25/5/0.5]

Preparation was similar to Example 4. i.v. in DCM=0.61 dl/g. Tg=64° C.

EXAMPLE 27

An inventive polyester was prepared in a manner similar to Example 5, using adipic acid, bisphenol A, and 4-acetoxyphenylmethyldiphenylphosphonium p-toluenesulfonate in molar ratios 100/99.5/1, i.v. in DCM=0.13 dl/g, Tg=44° C.

EXAMPLES 28-31

Inventive polyesters were prepared in a manner similar to Example 5, using the monomers adipic acid, bisphenol A, and methylbis(4-acetoxyphenyl)phenylphosphonium p-toluenesulfonate in molar ratios 100/n/m, respectively. Results are presented in Table VI.

TABLE VI

| Example | n | m | i.v. in DCM (dl/g) | Tg(°C.) |
|---|---|---|---|---|
| 28 | 99 | 1 | 0.19 (in DCM) | 53 |
| 29 | 90 | 10 | 0.27 (in DCM) | 69 |
| 30 | 50 | 50 | 0.16 (in P:CB) | — |
| 31 | 0 | 100 | 0.09 (in DMF) | 62 |

EXAMPLES 32–33

Inventive polyesters were prepared in a manner similar to Example 5, using the monomers dimethyl terephthalate, adipic acid, neopentyl glycol, and methylbis(4-acetoxyphenyl)phenylphosphonium p-toluenesulfonate in molar ratios x/y/n/m, respectively. Results are presented in Table VII.

Table VII

| Example | x | v | n | m | i.v. in DCM (dl/g) | Tg(°C.) |
|---|---|---|---|---|---|---|
| 32 | 94.05 | 5.95 | 99 | 1 | 0.17 | 57 |
| 33 | 90.25 | 9.75 | 95 | 5 | 0.18 | 53 |

EXAMPLE 34

Poly(neopentylene-co-methylphenyldiphenylenephosphonium p-toluenesulfonate 99/1 terephthalate-co-cyclohexane-1,4-dicarboxylate 89.1/10.9)

Preparation was similar to Example 5. i.v. in DCM=0.17 dl/g, Tg=60° C.

EXAMPLE 35

An inventive polyester was prepared in a manner similar to Example 5, using the monomers, adipic acid, bisphenol A diacetate, and methyltris(4-acetoxyphenyl)phosphonium p-toluenesulfonate in molar ratios 100/98.5/1, respectively. i.v. in DCM=0.09 dl/g, Tg=31° C.

EXAMPLE 36

An inventive polyester was prepared in a manner similar to Example 2, using the monomers, dimethyl adipate, bisphenol A diacetate, and ethylenebis(4-acetoxyphenyldiphenylphosphonium) di-p-toluenesulfonate in molar ratios 100/75/25, respectively. i.v. in DCM=0.17 dl/g, Tg=67° C.

EXAMPLE 37

Poly[neopentylene-co-oxydiethylenebis(diphenylphenylenephosphonium) di-p-toluenesulfonate 99/1 terephthalate-co-adipate 94.05/5.95]

Preparation was similar to Example 2. i.v. in DCM=0.2 dl/g, Tg=62° C.

EXAMPLE 38

In a polymer flask with open sidearm and teflon-coated bottom was placed a mixture of 90.8 g (0.4675 mol) dimethylterephthalate, 4.0 g (0.025 mol) dimethyl glutarate, 3.04 g (0.005 mol) 4-carbomethoxyphenyldiphenylmethylphosphonium 3,5-dicarbomethoxybenzenesulfonate, 70.3 g (0.675 mol) neopentyl glycol, and 1.70 g (0.0125 mol) pentaerythritol. The mixture was then heated in a 220° C. bath under nitrogen until molten. 5 drops of tetraisopropyl orthotitanate were added, and the mixture was heated at 220° C with nitrogen bubbling through the melt for 2 hours and at 240° C. for 1 hour. The mixture was then stirred at reduced pressure (0.50 mm Hg) for 45 min at 240° C. and allowed to cool. i.v. in DCM=0.28 dl/g, Tg=65° C.

EXAMPLE 39

An inventive polyester was prepared in a manner similar to Example 38, using the monomers, dimethyl terephthalate, dimethyl glutarate, methylbis(4-carbomethoxyphenyl)phenylphosphonium 3,5-dicarbomethoxybenzenesulfonate, neopentyl glycol, and pentaerythritol in molar ratios 93/5/1/95/2.5, respectively. i.v. in DCM=0.42 dl/g, Tg=66° C.

EXAMPLES 40–45

Toners and Developers

These examples illustrate the good charging properties of inventive polyesters in dry electrostatographic toners and developers. The polyesters of Examples 13, 15, and 16 were employed as dual function binder/charge-control agents. In Examples 40 and 43 the polyester of Example 13 was employed. In Examples 41 and 44 the polyester of Example 15 was employed. In Examples 42 and 45 the polyester of Example 16 was employed.

In each example toner particles were prepared by melt-compounding 100 parts by weight of the polyester with 6 parts by weight of Regal 300 TM pigment (a trademarked carbon black pigment sold by Cabot Corporation, USA). This was accomplished by heating and mixing the pigment and polyester on a two-roll rubber mill, cooling the mass to room temperature, and coarse grinding and fluid energy-milling to produce toner particles having diameters in the range of 2 to 40 micrometers. For each example the phosphonium salt charge-control moiety concentration in moles per gram of total toner material was calculated.

In each example the toner particles were then mixed with carrier particles in a closed container on a two-roll mill for several minutes to form a triboelectically charged two-component dry electrostatographic developer comprising about 4 weight percent toner particles. The carrier particles employed in Examples 40–42 were uncoated sponge iron particles, while in Examples 43–45 they were sponge iron particles coated with thin poly(vinylidene fluoride) film.

In each example the triboelectric charge per mass of toner particles was then measured in microcoulombs per gram ($\mu$c/g) by the "Blowoff" method. Results are reported in Table VIII.

TABLE VIII

| Example | Carrier | Phosphonium moiety Concentration in toner (moles/g) | Toner charge ($\mu$c/g) |
|---|---|---|---|
| 40 | uncoated | $1 \times 10^{-5}$ | −3.1 |
| 41 | uncoated | $2 \times 10^{-5}$ | 14.8 |
| 42 | uncoated | $4 \times 10^{-5}$ | 33.7 |
| 43 | coated | $1 \times 10^{-5}$ | 21.5 |
| 44 | coated | $2 \times 10^{-5}$ | 41.5 |
| 45 | coated | $4 \times 10^{-5}$ | 45.7 |

EXAMPLES 46–49

Charging capability compared to charge-control agents outside the scope of the invention In these examples the charge-control capability of inventive polyesters is shown and compared to the capabilities of charge-control agents outside the scope of this invention.

In each example and control the charge-control agent was melt-compounded into toner particles and mixed with coated carrier particles as in Examples 43–45. In each example and control the toner particles contained no added pigment or colorant, but the charge-control agent, whether polymeric or not, was mixed with an additional polyester, namely, poly(neopentylene-co-pentaerythrityl 95/2.5 terephthalate-co-glutarate 95/5), in proportions sufficient to yield a concentration of $2.1 \times 10^{-5}$ moles of phosphonium salt charge-control moieties per gram of total material in the toner particles.

After mixing with poly(vinylidene fluoride)-coated strontium ferrite carrier particles, each toner's triboelectric charge was measured in microcoulombs per gram of toner ($\mu c/g$) by the "MECCA" method.

In control A, the only charge-control agent was methyltriphenylphosphonium p-toluenesulfonate, a non-polymeric charge-control agent of the prior art.

In control B, the only charge-control agent was a polyester formed by polycondensation of the monomers, dimethyl terephthalate, dimethyl glutarate, methyltriphenylphosphonium 3,5-dicarbomethoxybenzenesulfonate, neopentyl glycol, and pentaerythritol in molar ratios 94/5/1/95/2.5, respectively. This is a phosphonium salt polyester, wherein only the anionic portion of the salt is covalently bonded to the polyester (by two ester linkages).

In Example 46, the only charge-control agent was a polyester of the present invention, poly[neopentylene-co-pentaerythrityl 95/2.5 terephthalate-co-glutarate-co-methylphenylphosphoniumbis(4-benzoate) p-toluenesulfonate 94/5/1], wherein only the cationic portion of phosphonium salt is bonded into the polyester (through two ester linkages).

In Example 47, the only charge-control agent was the inventive polyester of Example 38, wherein the cationic portion of the phosphonium salt is covalently bonded to the polyester (through one ester linkage), and the anionic portion of the phosphonium salt is covalently bonded to the polyester (through two ester linkages).

In Example 48, the only charge-control agent was the inventive polyester of Example 39, wherein both the cationic and the anionic portions of the phosphonium salt are covalently bonded into the polyester (each through two ester linkages).

In Example 49, charge-control was provided by a 1 to 1 (by weight) mixture of the polyesters employed in control B and in Example 46 (i.e., a mixture of a polyester with only the anionic portion of the phosphonium salt covalently bonded and a polyester with only the cationic portion of the phosphonium salt covalently bonded to the polyester).

Results are presented in Table IX. Note again that all controls and examples are developers having $2.1 \times 10^{-5}$ moles of phosphonium salt moieties per gram of total material in the toner particles.

Table IX

| Example | Nature of the Charge-Control Agent | Toner Charge ($\mu c/g$) |
|---|---|---|
| Control A | non polymeric phosphonium salt | 40.4 |
| Control B | polyester with only anionic portion of the phosphonium salt covalently bonded (2 bonds) | 33.2 |
| 46 | polyester with only cationic portion of the phosphonium salt covalently bonded (2 bonds) | 67.3 |
| 47 | polyester with cationic portion of the phosphonium salt covalently bonded (1 bond) and anionic portion covalently bonded (2 bonds) | 61.1 |
| 48 | polyester with cationic portion of the phosphonium salt covalently bonded (2 bonds) and anionic portion covalently bonded (2 bonds) | 61.2 |
| 49 | 1:1 mix of polyesters of control B and Example 46 | 55.8 |

The data in Table IX show that covalently bonding the cationic portion of the phosphonium salt to a polyester yields a considerable increase in charge-control efficiency over the corresponding non-polymeric phosphonium salt charge agent. If the anionic portion of the cation-bonded phosphonium salt is also covalently bonded, or if the cation-bound polyester is mixed with an anion-only-bound phosphonium polyester, the charge-control efficiency is lessened somewhat but is still considerably higher than the efficiency of the non-polymeric phosphonium salt (thus providing convenient means for adjusting the charge-control efficiency). The data also show that covalently bonding only the anionic portion of the phosphonium salt to a polyester appears to yield a considerable decrease in charge-control efficiency compared to the corresponding non-polymeric phosphonium salt.

EXAMPLES 50–57

Charge level versus phosphonium salt moiety concentration (and comparison to non-polymeric phosphonium salts)

In these examples the charge level provided in dry toners and developers by the inventive polyesters is shown versus the concentration of the phosphonium salt moiety in the toner, and this performance is compared to the corresponding non-polymeric phosphonium salt.

In these examples and controls, toner particles, and mixtures of them with poly(vinylidene fluoride)-coated strontium ferrite carrier particles to form charged developers, were prepared similarly to Examples 43–45, except that the carbon black pigment was included in the toner particles in the proportion of 5 parts by weight pigment per 100 parts polyester binder. Each developer's toner charge was measured in microcoulombs per gram of toner ($\mu c/g$) by the "MECCA" method.

The control toners and developers contained the polyester toner binder, poly(1.2-propylene-co-glyceryl 92.5/5 terephthalate-co-glutarate 86/14), and the prior art non-polymeric charge-control agent, methyltriphenylphosphonium p-toluenesulfonate, at various concentrations of charge-control agent.

The toner particles in the developers of Examples 50–53 contained the inventive dual function polyester binder/charge-control agent, poly[1,2-propylene-co-glyceryl 92.5/5 terephthalate-co-glutarate-co-methylphosphoniumtris(4-benzoate) p-toluenesulfonate n/14/m]. The molar ratios, n/m, were: Ex. 50=85.8125/0.125; Ex. 51=85.625/0.25; Ex 52=85.25/0.5; and Ex. 53=84.5/1.

The toner particles in the developers of Examples 54–57 contained the inventive dual function polyester binder/charge-control agent, poly[1,2-propylene-co-glyceryl 92.5/5 terephthalate-co-glutarate-co-methylphenylphosphonium-bis(4-benzoate) p-toluenesulfonate n/14/m]. The molar ratios, n/m, were: Ex. 54=85.875/0.125; Ex. 55=85.75/0.25; Ex. 56=85.5/0.5; and Ex. 57=85/1.

Results are presented in Table X.

TABLE X

| Example | Phosphonium salt moiety concentration in toner (moles/g) | Toner Charge (μc/g) |
|---|---|---|
| Control C | 0 | 7.9 |
| Control D | $0.53 \times 10^{-5}$ | 20.2 |
| Control E | $1.06 \times 10^{-5}$ | 26.2 |
| Control F | $3.49 \times 10^{-5}$ | 42.4 |
| 50 | $0.59 \times 10^{-5}$ | 24.3 |
| 51 | $1.18 \times 10^{-5}$ | 43.6 |
| 52 | $2.36 \times 10^{-5}$ | 68.0 |
| 53 | $4.67 \times 10^{-5}$ | 80.6 |
| 54 | $0.59 \times 10^{-5}$ | 44.1 |
| 55 | $1.18 \times 10^{-5}$ | 51.7 |
| 56 | $2.35 \times 10^{-5}$ | 63.1 |
| 57 | $4.66 \times 10^{-5}$ | 76.4 |

The results indicate the greater charge-control efficiency of the inventive polyesters compared to the corresponding non-polymeric prior art phosphonium salt charge-control agent and also indicate that greater changes in charge level are achievable by a given increase in the phosphonium salt moiety concentration in the toners containing the inventive polyesters than are achievable by the same concentration increase in the toners containing the prior art non-polymeric salts.

The invention has been described in detail with particular reference to certain preferred embodiments thereof, but it should be appreciated that variations and modifications can be effected within the spirit and scope of the invention.

What is claimed is:

1. A polyester containing a quaternary phosphonium salt comprising a cationic portion and an anionic portion, wherein the cationic portion of the salt comprises a phosphorous atom directly covalently bonded to at least one aryl moiety substituted with a group having an ester linkage to the rest of the polyester, and wherein the anionic portion of the salt comprises an arylsulfonate moiety in which the aryl group is unsubstituted or is substituted with one or more alkyl, halide, or group having an ester linkage to the rest of the polyester.

2. The polyester of claim 1, wherein the phosphonium salt has the structure

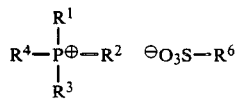

or the structure

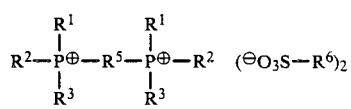

wherein:

$R^1$, $R^2$, $R_3$, and $R^4$ are each independently: alkyl which is unsubstituted or substituted with one or more aryl; or aryl which is unsubstituted, substituted with one or more alkyl, or substituted with one or more group containing an ester linkage to the rest of the polyester;

$R^5$ is alkylene, oxydialkylene, or arylenedialkylene; and $R^6$ is aryl which is unsubstituted or substituted with one or more alkyl, halide, or group containing an ester linkage to the rest of the polyester; with the provisos that:

each alkyl or alkylene moiety recited above has from 1 to 20 carbon atoms;

each aryl or arylene moiety recited above has from 6 to 14 carbon atoms; and at least one of $R^1$, $R^2$, $R^3$, and $R^4$ contains at least one ester linkage to the rest of the polyester.

3. The polyester of claim 2, wherein the cationic portion of the phosphonium salt is monovalently appended to the polyester through an ester linkage contained in $R^1$ of structure I.

4. The polyester of claim 3, wherein the anionic portion of the phosphonium salt is divalently bonded into the polyester through two ester linkages contained in $R^6$ of structure I.

5. The polyester of claim 2, wherein the cationic portion of the phosphonium salt is divalently bonded into the polyester through ester linkages contained in $R^1$ and $R^2$ of structure I.

6. The polyester of claim 5, wherein the anionic portion of the phosphonium salt is divalently bonded into the polyester through two ester linkges contained in $R^6$ of structure I.

7. The polyester of claim 2, wherein the cationic portion of the phosphonium salt is divalently bonded into the polyester through two ester linkages contained in $R^1$ of structure I.

8. The polyester of claim 2, wherein the cationic portion of the phosphonium salt is divalently bonded into the polyester through ester linkages contained in the two $R^1$ groups of structure II.

9. The polyester of claim 2, wherein the cationic portion of the phosphonium salt is trivalently bonded into the polyester through ester linkages contained in $R^1$, $R^2$, and $R^3$ of structure I.

* * * * *